US00RE40029E

(19) United States
(12) Reissued Patent
Schutz

(10) Patent Number: US RE40,029 E
(45) Date of Reissued Patent: Jan. 22, 2008

(54) PROCESS FOR THE CONTINUOUS MANUFACTURE OF SAUSAGES

(75) Inventor: Antonio Jorge Schutz, Buenos Aires (AR)

(73) Assignees: Frigorifico San Carlos Sociedad Anonima, Buenos Aires (AR); Adam Anderson, Overland Park, KS (US)

(21) Appl. No.: 10/269,015

(22) Filed: Oct. 10, 2002

(Under 37 CFR 1.47)

Related U.S. Patent Documents

Reissue of:
(64) Patent No.: 6,135,869
Issued: Oct. 24, 2000
Appl. No.: 09/177,080
Filed: Oct. 23, 1998

(51) Int. Cl.
*A22C 11/00* (2006.01)

(52) U.S. Cl. ..... 452/32; 452/35; 53/453
(58) Field of Classification Search ..... 452/21, 452/22, 30–32, 35–37, 46, 51
See application file for complete search history.

(56) References Cited

U.S. PATENT DOCUMENTS 4,034,536 A * 7/1977 Mahaffy et al. ..... 53/433
4,614,076 A * 9/1986 Rathemacher ..... 53/433
4,747,253 A * 5/1988 Schulte ..... 53/433
5,053,239 A * 10/1991 Vanhatalo et al. ..... 426/412
5,129,512 A * 7/1992 Garwood ..... 206/213.1
5,514,029 A * 5/1996 Schutz ..... 452/35
5,813,197 A * 9/1998 Aguzzoli ..... 53/453

FOREIGN PATENT DOCUMENTS

AR 289791 * 4/1983

* cited by examiner

*Primary Examiner*—Thomas Price
(74) *Attorney, Agent, or Firm*—Hovey Williams LLP

(57) ABSTRACT

A process and apparatus for the continuous manufacture of food products such as sausages is provided which eliminates the need for intermediate stuffing of the food product into casings which are discarded prior to final packaging. The preferred apparatus of the invention includes first and second heated rollers (16, 17) each presenting a plurality of elongated, axially aligned channels or recesses (18,20) which are circumferentially and axially spaced on the corresponding rollers (16, 17); in addition, the second roller (17) includes a series of elongated, continuous, tube-receiving openings (22) extending between each series of aligned openings (20). Mechanisms (28, 29) are associated with the rollers (16, 17) in order to continuously feed elongated synthetic resin sheets (34, 35) into the nip between the rollers (16, 17). Rollers (24, 27) are provided for forcing portions of the sheets (34,35) into the recesses (18,20) and openings (22) prior to passage of the sheets (34,35) between the rollers (16, 17) where they are longitudinally heat sealed together to continuously form elongated, aligned food-receiving cavities (48). A plurality of feeding tubes (11) extend through the rollers (16, 17) and are located within the corresponding openings (22) and recesses (20) during rotation of the rollers (16, 17). The tubes (11) continuously direct the flowing food material into the cavities (48), the latter being transversely heat sealed via transverse sealing bars (60, 60') to form complete, enclosed food packages.

38 Claims, 6 Drawing Sheets

PROCESS FOR THE CONTINUOUS MANUFACTURE OF SAUSAGES

Matter enclosed in heavy brackets [ ] appears in the original patent but forms no part of this reissue specification; matter printed in italics indicates the additions made by reissue.

FIELD OF THE INVENTION

The instant invention relates to a novel process for the continuous manufacture of sausages, to a machine for carrying out said process and to the product thus obtained.

The process and machine of the instant invention may be used for manufacturing and packaging different varieties of sausages in the market, and in a preferred embodiment, the process and machine of the invention is used for manufacturing the known German sausages or of the frankfurter type.

BACKGROUND OF THE INVENTION

1. Prior Art

At present, it is known that stuffed food, particularly sausages, are stuffed into a tripe or synthetic material (plastics) tube which then have to be "peeled" in order that the sausage may be packed.

Known processes are comparatively expensive and time consuming, since they require steps that are deleted by the use of the method of the invention. In fact, summarizing the present operation, the food material is stuffed into a very long synthetic tripe compacted into a cartridge and, once stuffed with paste, it is twisted in pre-determined regions to form a string of independent sausages, of a determined length, which are hung in cooking conveyors. After this operation, sausages are let to cool in order to subject them to the action of the peeling machines. I.e., the plastic sheath or casing (tripe) is removed for the final vacuum packaging thereof.

Known processes for manufacturing skinless stuffed food materials require four machines, namely: a) stuffer; b) twister and cooler; c) peeler and d) packager. Between the twisting and peeling steps, stuff such as sausages, large sausages, etc. are cooked. After cooking, the product is passed to the cooler and peeler, then conveyed to the packaging machine. Once packaging is ready, sausages are passed to the delivery section.

Due to the features of the known manufacturing process, a loss of about 8% in raw material is produced.

This conventional manufacturing line requires a minimum space of twelve meters long for the five processes mentioned, which results in an important investment in building and machinery.

Further, another disadvantage of traditional methods is the impossibility of obtaining absolute vacuum, due to the presence of a small amount of air contacting the product, which makes it perishable in a short time due to pollution reasons.

Technology has developed new packaging processes, but these improvements took place for packaging products in the form of granules, powder or liquids, wherein the quality control of the product to be packed is controlled by a dispenser device, and pressure exerted on a product to shape the package is not required.

Further, these processes are not continuous, but are of intermittent sequence. Therefore, their production capacity is seriously limited as compared to a continuous process.

In the specific case of German type sausages packaging, the possibility of a continuous process is difficult due to the cooking step, as well as due to the fact that the sausage paste takes the shape of the package, which requires certain pressure in the packaging step. This pressure is what determines that the cross section of the package be rendered uniform and, consequently, the product weight constant.

Also, another disadvantage in the continuous process is the requirement that the package forming the sausage is the final package directed to consumers in order to avoid pollution of the product, in case such product after being shaped and cooked is introduced into a final package.

U.S. Pat. No. 5,053,239 discloses a process and apparatus for manufacturing German type sausages, which describes producing the sausage directly into the final package, which then allows cooking the sausage paste thus packaged.

However, although the mentioned process affords an improvement over the known process, this process is of intermittent sequence and requires synchronism between feeding of the portions forming the sausage and the transversal closure means of the package. Since said patent does not show the machine for producing said sausage paste portions of a pre-determined size, it does not specify the way in which operation control is carried out to attain synchronism of the package cross closure means, we may consider this process inapplicable.

In fact, from the reading of the mentioned patent and drawings, it may be seen that feeding tubes 1 extend between peripheral channels of cylinders 14 and 15 up to the outlet port close to the molding means, comprised by rollers 4 and 5 which have elements transversely pressing the tubular packing portions without sausage paste. The specification of U.S. Pat. No. 5,053,239, also does not explain the way in which small portions of sausage paste are passed through a feeding tube or the means used in order that each sausage portion maintains a constant space with the respect to the following one. Further, for the transversal sealing of the film, the process requires that such region be free of sausage paste, this being an outstanding difference with the method of the instant invention.

Also known is the system provided by Argentine Patent No. 228,903, which comprises a discontinuous feeding system. This systems operates by feeding molding cavities between sheets which are longitudinally welded, but the cavities of which are communicated by minor channels, producing a zigzag travel between sheets, then the regions into which channels are included are sealed.

Several trials have demonstrated that it is very difficult to obtain proper operation of this process, since paste pressures and differences in passage sections, as well as the zigzag arrangement produce at least an effect braking displacement, which at least reduces production to non profitable limits.

SUMMARY OF THE INVENTION

The process and machine of the instant invention afford the production of stuffs in general, particular of sausages, in a continuous way, using a single container which may be molded with the product pressure; the filled container having a cross section and a longitudinal measure of the container.

In the particular case of packaging German kind sausages, sausage packaging is attained without the use of synthetic tripe for shaping the sausage. This feature notably reduces the high cost of the conventional method, since said tripe should have a high amount of requirements for shaping uniform skin sausages, without wrinkles. Therefore, the cost is highly increased by the technology involved in manufacture.

The sausage is packed into the final package and then is subjected to cooking, which warrants non pollution of the product during the production process, and steps of tripe shaping and further peeling are prevented.

The pressure under which sausage paste is packed prevents any possibility of air within the package.

Further, the process and machine of the instant invention has important economic advantages, such as reduction of the costs of raw material required for manufacturing by the elimination of synthetic tripe, which is unavoidable in the conventional process; reduction of handling operations, since the sausage manufactured with the instant process and machine, as will be seen below, passes to cooking and then, directly, to delivery; reduction of 8% losses produced in the conventional process, these losses being almost completely eliminated; an important increase in production yield, since the machine of the invention, operating at a minimum speed, affords four times the production of conventional plants. At a higher speed, production could be increased eight times without difficulties. Further, the decreased surface of the production plant is also important, since the invention is comprised by a single machine of reduced size (2 meters), as compared to known machines requiring 12 meters. A further feature is a higher production speed as compared to conventional machines.

The continuous process for continuous manufacturing of sausages of the instant invention, is comprised by the following steps:

continuums feeding of a pair of sheets, one above and the other below tubes feeding the paste forming the product to be packaged, continuously forming at the upper sheet individual molds for the product to be packed;

simultaneously forming at the lower sheet, individual molds corresponding to the molds of the upper sheet, but connected one to the other by cavities narrower than those of said individual molds, the size of which allows for housing of feeding tubes;

tensioning the sheets at least at the sealing regions between them;

longitudinally sealing the sheets on both sides of said individual molds;

advancing said individual molds thus formed beyond the outlet of said feeding tubes, closing under pressure the narrowest cavity at the front region of the mold;

filling the product to be packed under proper pressure, in a continuous way, along with the container of sheets shaped by the molds;

pressure closing the narrowest cavity at the rear portion of the individual mold thus filled in, closing in turn the front part of the following mold, and heat sealing the narrowest cavities closed under pressure.

Further, the machine for carrying out the process of the invention constitutes as additional object of the invention. The machine comprises a pair of rollers, contacting in a parallel and tangential manner, driving corresponding thermoplastic sheet materials, one of said rollers having means for shaping half of the individual molds of the product to be packed, while the other roller is also provided with means for shaping half of the individual molds for the product to be packed, said other halves being provided with means communicating one with the other, a device for feeding the product to be packed having a plurality of feeding means extending between said sheet materials, through the communication means of said other roller. Both rollers are provided with means for sealing planar joints of said sheet materials, means for cooling said planar joints at the outlet of said rollers and means for pressing and sealing the transversal joints of said individual molds thus formed. At the outlet end of the machine, following said pressing and sealing means, there are means for cutting excess sheet material from the packed product and means for wrapping said excess sheet material.

According to a feature of the invention, means forming half of the individual molds of the product to be packed at each roller, comprise channeled surfaces formed as per cylindrical modular envelope portions, fixedly removable engaged to said rollers.

Further features of the object of the invention will be descried hereinbelow.

BRIEF DESCRIPTION OF THE DRAWINGS

Taking into account the above mentioned objects, and related ones, the invention will be described on the basis of construction and parts combination details, as disclosed in the following preferred embodiment of the invention, taking in connection with the accompanying drawings, in which.

In the figures, the same reference symbols indicate the same or corresponding parts.

Figure 1:
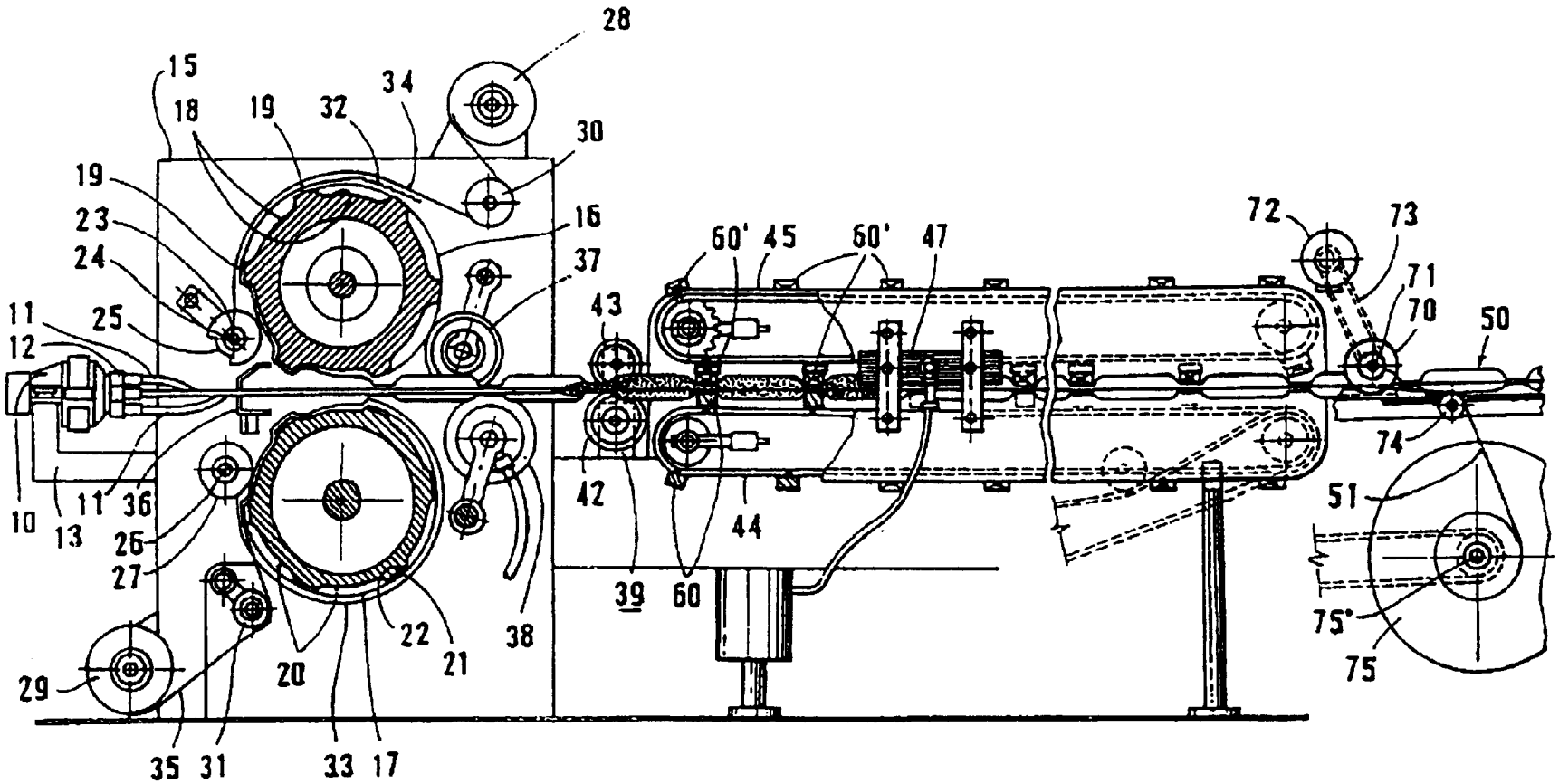
FIG. 1 is a schematic longitudinal section of the machine of the invention, showing the process sequence, illustrating its general constitution and arrangement of the forming elements.

DETAILED DESCRIPTION OF THE PREFERRED EMBODIMENT.

A substantially hollow head 10 wherein six nozzles 12 are provided, from which six tubes 11 project for distributing the product to be packed comprise the machine of the invention. Said head 10 is mounted on a cross member 13 rigidly connected to frame 14 of the machine, which comprises a pair of side brackets 15 between which a pair of shaping rollers, an upper roller 16 and a lower roller 17, are mounted. The upper shaping roller 16 at the cylindrical surface is provided with a plurality of channels 18, which being six, extend about six circumferences of the upper shaping roller 16 and are spaced by regions 19. Six channel 18 circumferences are provided on said upper shaper roller 16, matching with the distribution nozzles 12 in number.

Under the upper shaping roller 16 there is a second lower shaping roller 17, having the same features as the upper roller, i.e., having channels 20, which being six, extend about six circumferences of said roller 17 and are spaced by cylindrical regions 21, which in turn have corresponding channels 22 equal in depth to channels 20, which serve to house distribution nozzles 12, as explained below. Both shaping rollers 16 and 17 have a tangential contact along their cylindrical surfaces, which are in front of nozzles 12 and distribution tubes 11, and are synchronized in order that corresponding regions 19 and 21 match during rotation of said rollers 16 and 17.

Figure 3:
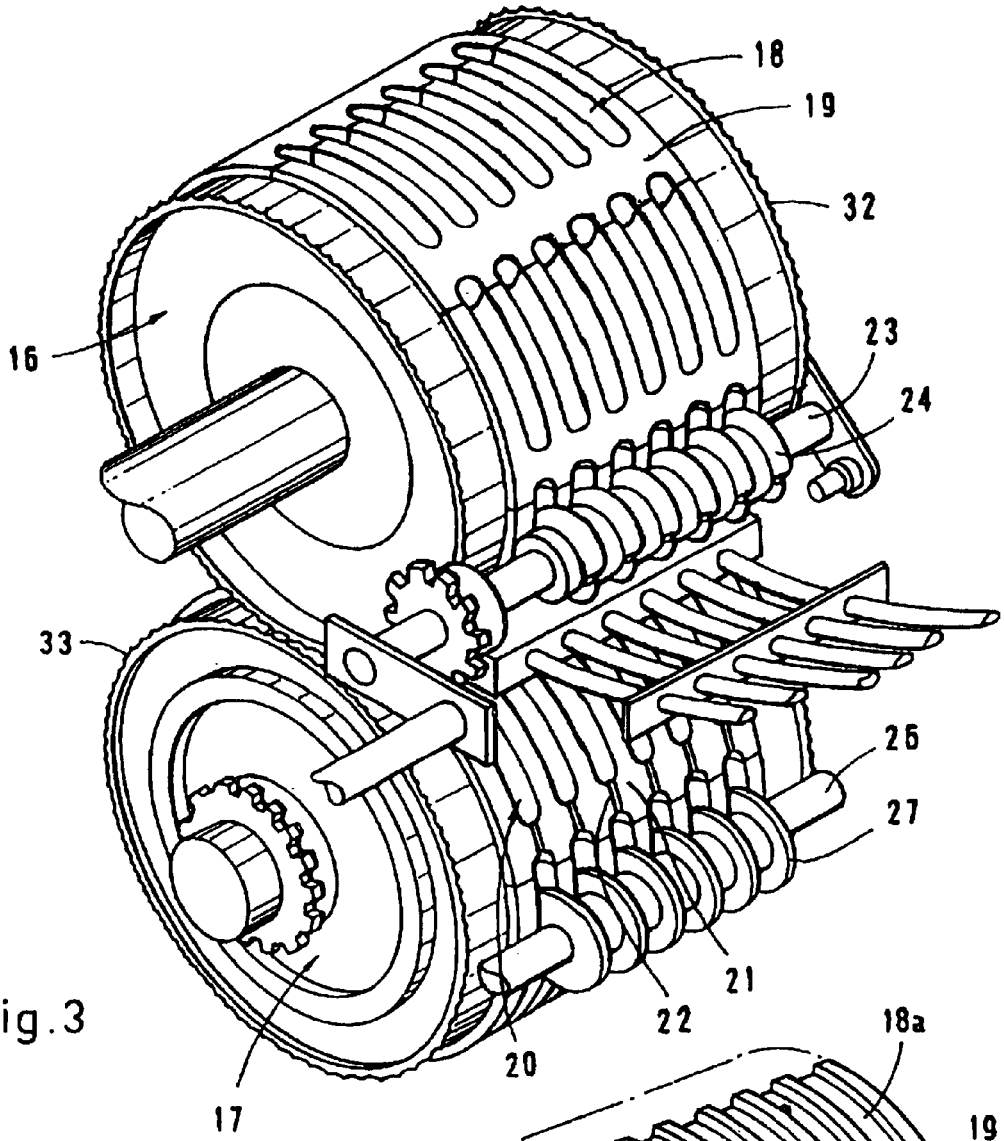
FIG. 3 is a perspective view of both shaping rollers, seen from the feeder of the product to be packed.
Figure 3A:
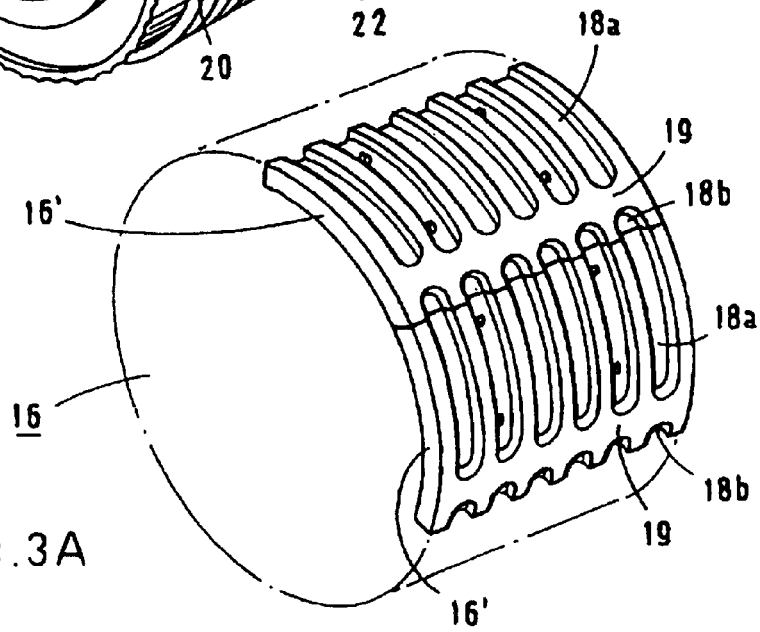
FIG. 3A is a perspective schematic view showing an embodiment comprised by modular envelope sections for the channeled surface forming such rollers.
Figure 3B:
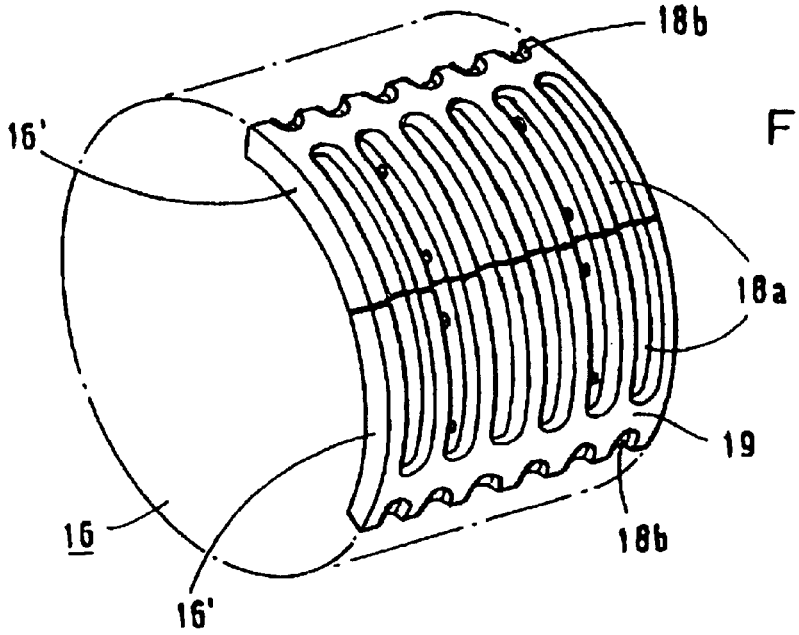
FIG. 3B is a perspective view similar to that of FIG. 3A showing said assembled sections for obtaining longer sausages.
Figure 4:
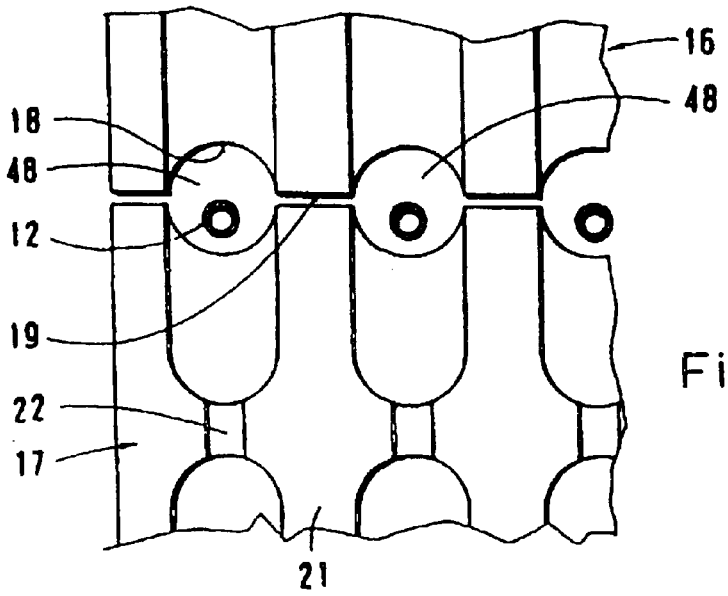
FIG. 4 is a partial cross section of a front elevation of shaping rollers and feeding tubes arrangement.
Figure 5:
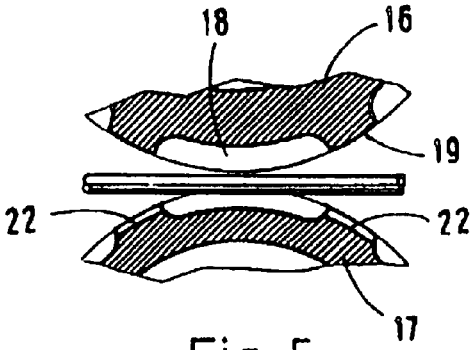
FIG. 5 is a partial cross section of the contact of both shaping rollers when the corresponding channeled surfaces coincide.
Figure 6:
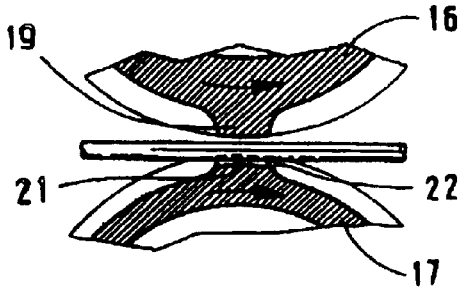
FIG. 6 is a cross section similar to that of FIG. 5 showing coincidence between the cylindrical portions of both shaping rollers and the passage of the feeding tube.
Figure 9:
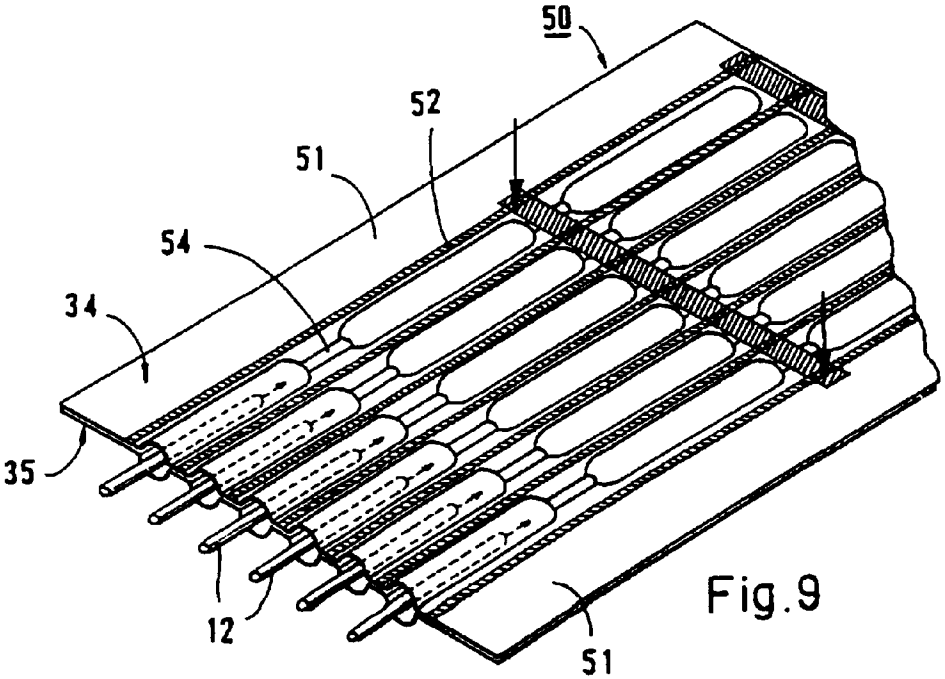
FIG. 9 shows an already shaped sheet material, filling thereof with the material to be packed and closure of the front end of the corresponding molds.
Figure 10:
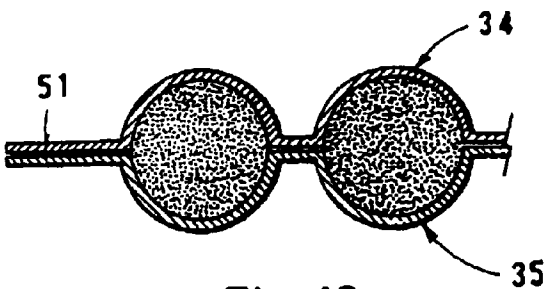
FIG. 10 is a partial cross section of the finished package, containing the product.

Cylindrical surfaces of rollers 16 and 17 are formed by various portions of modular envelopes which, as a whole, have a development equal to the corresponding cylindrical surface, which are designated with reference numeral 16' in FIGS. 3A and 3B. In said figures, only the upper shaping roller 16 is shown, and the description hereinbelow refers thereto. Nevertheless, this description also serves for the lower shaping roller 17.

Channels 18 are formed in each modular envelope portion 16', being located as described. The particular feature is that at each circumference portion there are provided, separated by a single section 19, a larger channel region 18a and a smaller channel region 18b, having a blind end and the other end open towards the opposite straight edges of the envelope sector 16'.

As shown in FIGS. 3A and 3B, the arrangement allows two mounting positions for obtaining two different lengths of sausages.

Between the distribution head 10 and the upper shaping roller 16, there is a shaft 23, parallel to the shaft of said roller 16 and close to the path of tubes 11, mounted on one of the side brackets 15 of the machine frame, such that it is resiliently collapsible with respect of the surface of roller 16. Said shaft 23 has a series of six rollers 24, rotating therewith, the width and arrangement of which coincide with channels 18 of the upper shaping roller 16 and are housed therein, due to the resilient pressure of carrying shaft 23. Rollers 24 have a recess 25 the length and depth of which coincide with the cylindrical regions 19 of roller 16.

Between the distribution shaft 10 and the lower shaping roller 17 there is a shaft 26 parallel to the shaft of said roller 17 and close to the path of tubes 11, also mounted on one of the side brackets 15 of the machine frame. Said shaft 26 has, for rotating thereon, six narrow rollers 27, the width and arrangement thereof, matches with channels 20 of roller 17 and channels 22 of cylindrical portions 21.

The first portion of the machine is completed with two sheet plastic material feeding rollers for packaging the product; an upper roller 28 and a lower roller 29. Between the upper feeding roller 28 and the upper shaping roller 16 there is a tensioning-guiding roller 30 and between the lower feeding roller 29 and the lower shaping roller 17 there is a tensioning-guiding roller 31.

Both shaping rollers, upper roller 16 and lower roller 17, have at their ends, at both side of the channeled surfaces, teeth rows 32, and 33, respectively, for maintaining plastic sheets 34 of the upper feeding roller 28 and sheet 35 of lower feeding roller 29 tensioned.

Figure 2:
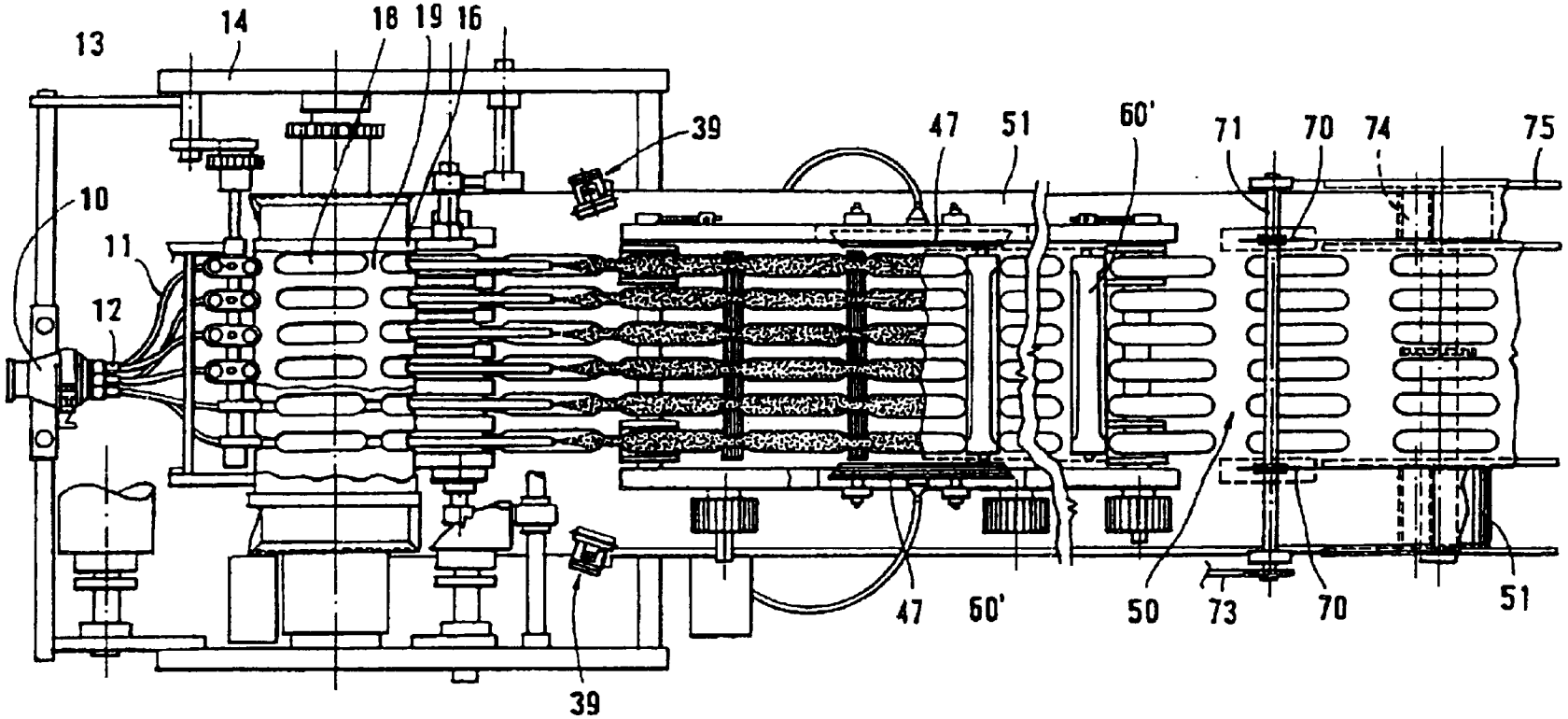
FIG. 2 is a plan view of the machine showing the feeding and shaping upper rollers of the sheet material and conveying chains with welding cross members, the first portion being shown in a partial section.

As shown in FIGS. 1 and 2, tubes 11 made of flexible material pass between the two shaping rollers 16 and 17, such that they are housed in channels 22 of cylindrical portions 21 of the shaping roller 17.

Before entering and passing through shaping rollers 16 and 17, tubes 11 pass through a housing 36, which is connected to a forced air source (not shown), which will be described below.

It is important to note that the upper shaping roller 16 is heated, such that its temperature allows softening and deformation of the upper sheet 34, within channels 18, by the action of rollers 24, such that in said sheet part of the package is pre-formed or molded, before filling thereof. The same happens with shaping roller 17, sheet 35 and channels 20, except in that at the ends of mold 50 forming the body of the product to be packed, narrower passages are formed, the size of which correspond to that of tubes 11 and channels 22.

On the other side of shaping rollers 16 and 17, at the outlet of sheet material 35 and 34, there is a roller 37 for pressing longitudinal joints 52 of sheets 34 and 35, parallel to the shaping roller 16, at the side of molds 50 formed by rollers 16 and 17, the width of which is equal to the space between channels 18 of roller 16.

Parallel to the shaping roller 17 and beneath pressing roller 37, there is a cooling roller 38 on which sheets 34 and 35, already shaped, bear to obtain cooling of longitudinal joints 52.

Figure 7:
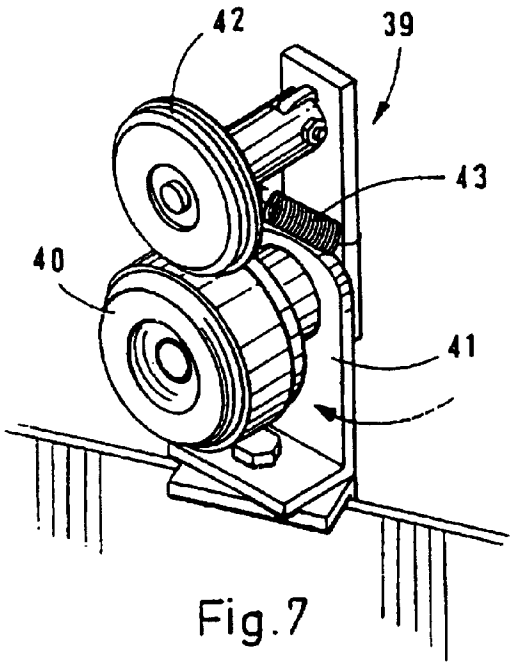
FIG. 7 is a perspective view of the transversal mechanism for tensioning the shaped sheet material.
Figure 8:
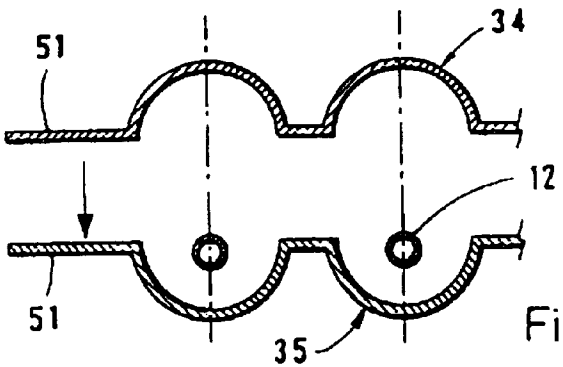
FIG. 8 is a cross section of the upper and lower sheet material, after being shaped, separated one from the other.
Figure 11:
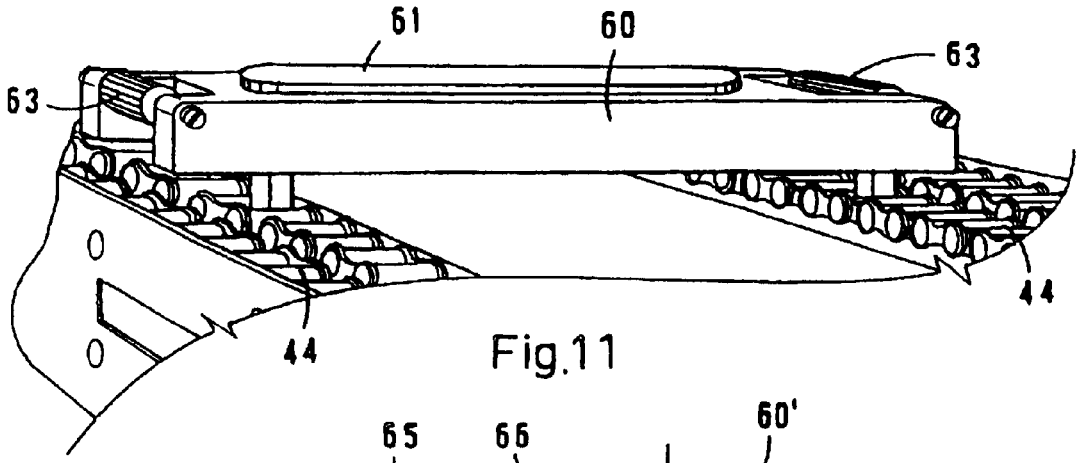
FIG. 11 is a detailed view of the machine showing one of the two jaw sets forming the device for tensioning the sheets at the welding region.

At both sides of the path or travel of sheets 34 and 35, already joined by welding of longitudinal joints 52, between molds 50, shaped in channels 20 and 22, i.e., forward pressing roller 37 and cooling roller 38, there is a pair of mechanisms 39 effecting transversal tension with respect to sheets 34 and 35. Said mechanisms 39, shown in FIG. 2 and in FIG. 7 in more detail, are comprised by a lower fixed roller 40 mounted with free rotation on a support 41, such that roller 40 be outwardly inclined in an angle and in the direction of advancement of sheets 34 and 35.

Matching with roller 40 and thereabove, there is a pressing roller 42 which holds sheets 34 and 35, this pressing roller 42 presses, by a traction spring 43, said sheets 34 and 35 in order to maintain them in a teniosed position, transversally and outwardly from their advance path.

The machine continues in a closure and cooling table, comprising a pair of conveying chains 44 and 45, having therebetween welding and pressing cross members 60 and 60', which have pressing and welding elements 61, 61' made of an electrically conductive material for increasing the temperature while receiving electric power.

Lower 44 and upper 45 conveyor chains are overlapped, such that the lower portion of the upper chain 45 overlaps the upper portion of lower chain 44. At a certain distance from the inlet of sheet material 34-35 to said conveying chains 44-45, cross members 60 and 60' contact a plate 47 connected to an electrical source (not shown), thus producing heating of cross member 46-46' during the path over which this is in contact with plate 47.

FIGS. 1 and 2 show a side arrangement for plate 47 and, therein, the ends of cross members 60 and 60' contact. Also, said plate may have a transversal location with respect to the forward direction of sheet material 34-35 and, thus, parallel to cross members 60 and 60'; to this end, each cross member has upper contacts 62, as shown in FIG. 12.

Pressing cross members 60 and 60' are provided at the ends with means for tensioning the sheets before sealing them, thus avoiding problems derived from imperfections or wrinkles which may be formed on said sheets during operation, thus assuring perfect adherence without folds. Thus, at the ends of each cross member 60 of lower conveying chains 44 there are corresponding free rotating toothed wheels 63, while at the ends of each cross member 60' corresponding to the upper conveying chains 45 there are mounted toothed jaws 64. Each jaw 64 pivots on one end around a shaft 65 and is tensioned by a spring 66.

Figure 13:
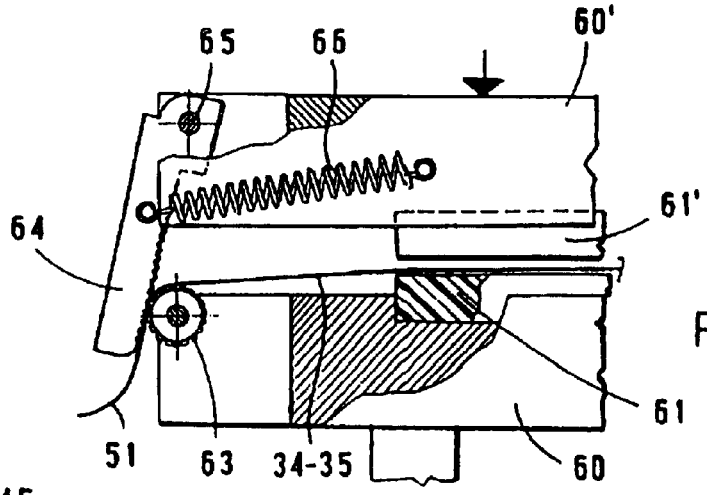
FIG. 13 is a partial cross section of one of said clamps of the tensioning device.
Figure 12:
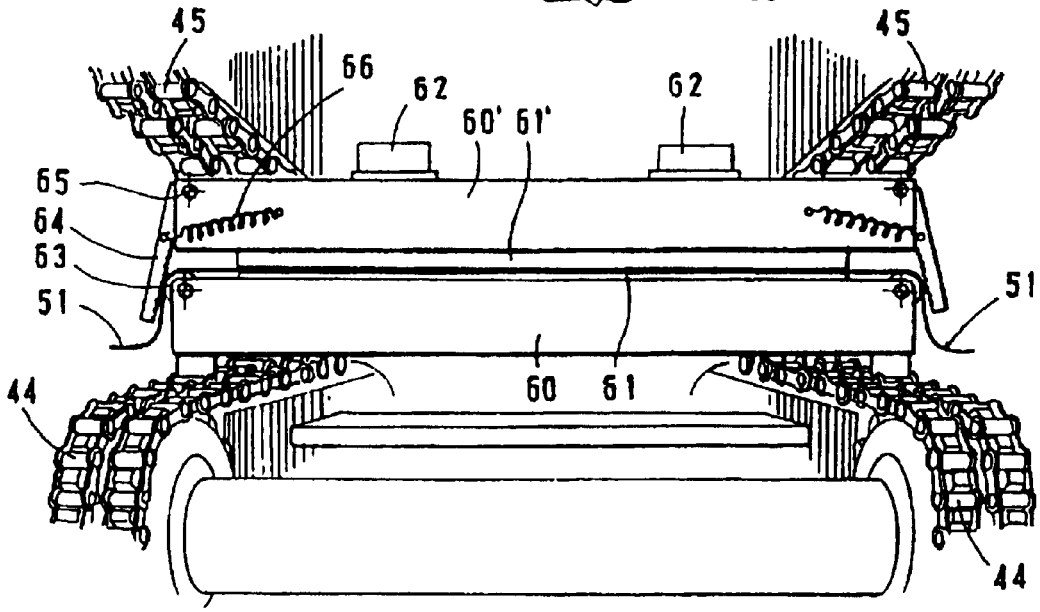
FIG. 12 is a perspective front view of a tensioning device comprised by clamps wherein relative movement between jaws cause tensioning of the sheets before sealing.

When cross members 60 and 60' are overlapped as shown in FIGS. 12 and 13, the toothed surface of each jaw 64 of the upper cross member 60' is pressed, by the action of spring 66, against the corresponding toothed wheel 63 of the lower cross member 60.

Tensioning means act on side edges of sheets 34 and 35 and, in order to allow them to act free without affecting the container 50, the region molded and sealed of the sheets is far from said sides thereof, thus forming corresponding side strips 51 of excess material.

At the discharge end of the machine there are means for cutting and wrapping said strips 51 of excess material. These means comprises a pair of circular knives 70 mounted in a transversal eye 71 acted by an electrical engine 72 through a proper transmission 73. Strips 51 of sheet material are guided by rollers 74 to corresponding coils 75 that are mounted on a drive shaft 75 provided with a clutch (not shown).

As an example not limiting the scope of the invention, operation of the machine will be explained below, since the method is explained per se.

The paste for sausages is introduced under pressure through head 10 and through nozzles 12 to tubes 11, and in turn shaping rollers 16 and 17 are rotated by means of proper mechanisms; therefore sheet 34 is fed to roller 16. Due to the heat received from said roller 16, sheet 34 softens and is so deformed and molded with the shape of channels 18, by effect of rollers 24, the shape of mold 50 being then maintained in said channels 18 by hot air blown from housing 36.

Simultaneously, at the shaping roller 17, the sheet 35 is deformed at channels 20 through the effect of narrow rollers 27 providing a molded cavity 53 in said sheet 35 matching with molds 50 formed in sheet 34, but which at both ends of molded cavity 53, form a smaller cavity 54, determined by channels 22 of cylindrical portions 21.

Consequently, at the outlet of shaping rollers 16 and 17 and around tubes 11, a receptacle 48 for housing the sausage paste has been formed between mold 50 of the upper sheet 34 and the molded cavity 53 of lower sheet 35. Rollers 37 and 38 determine welding of the longitudinal joints 52 of said receptacles 18. Sheets 34 and 35, being connected at the sides by rows of teeth 32 and 33 of corresponding rollers 16 and 17, maintain the transversal tension and allow their deformation by means of rollers 24 and 27, by virtue of the above described tensioning system, constituted by mounting of sheets on the side jaws 63-64 (FIGS. 12 and 13).

After sheets 34 and 35 exit, with receptacles 48 shaped, collapsing of the smaller cavity 54 formed by rollers 27 on sheet 35 is produced, and simultaneously filling of receptacles 48 with sausage paste is carried out. Since the smaller cavity 54 is closed, paste is subjected to the required pressure within receptacle 48. Collapsing of the smaller cavity 54 is produced by abutment of cross members 60 and 60' of corresponding conveying chains 44 and 45.

When receptacle 48 is filled with paste and under the required pressure, said receptacle 48 has advanced within conveying chains 44-45, therefore collapsing of the smaller cavity 54 of the lower portion of receptacle 48 is produced, and filling of the next receptacle 48 begins.

During advance of receptacle 48, with smaller front and rear cavities closed by cross members 60, 60', these contact electrical conductive plate 47, producing an increase in the temperature of corresponding elements 61-61', thus producing welding of sheets 34 and 35, in said smaller cavities 54, thus forming the sausage.

It is to be noted that collapsing of smaller cavities 54 by cross members 60-60' is produced such that the paste is housed therein displaces from the center of both sides, for producing afterwards heat sealing of said smaller cavities 54.

The packed sausages advance to the outlet end of the machine, wherein the means for cutting and wrapping excess side strips 51' of the package 50 formed by sheets 34 and 35 are located.

What is claimed is:

1. Process for the continuous manufacture of sausages, comprising the following steps:

continuous feeding of a pair of sheets, one above and the other below tubes feeding [the] *a* paste forming the product to be packaged,

*said sheets presenting sealing regions therebetween and each of said feeding tubes presenting an outlet;* continuously forming at the upper sheet individual molds for the product to be packed;

simultaneously forming at the lower sheet, individual molds corresponding to the molds of the upper sheet, but connected one to the other by cavities narrower than those of said individual molds, the size of [which allows] *said cavities allowing* the housing of feeding tubes*, each of said individual molds presenting a front region and a rear portion*;

tensioning the sheets at least at the sealing regions between them;

longitudinally sealing the sheets on both sides of said individual molds;

advancing said individual molds thus formed beyond the outlet of said feeding tubes, closing under pressure the [narrowest] cavity at the front region of the mold;

filling *said individual molds with* the [product to be packed] *paste,* under proper pressure, [in a continuous way, along with the container of sheets shaped by the molds] *while continuously advancing said individual molds*;

pressure closing the [narrowest] cavity at the rear portion of [the] *one of said* individual molds thus filled in, closing in turn [the front] *a* part *adjacent to the front region* of the following mold, and heat sealing the [narrowest cavities] *cavity* closed under pressure.

2. Machine for carrying out the process of claim 1, comprising a pair of rollers *presenting an outlet*, which contact in a parallel and tangential manner, driving corresponding thermoplastic sheet materials, one of said rollers having means for shaping half of the individual molds of the product to be packed, while the other roller is also provided with means for shaping half of the individual molds for the product to be packed, said other halves being provided with means communicating one with the other; a device for feeding the product to be packed having a plurality of feeding means extending between said sheet materials, through the communication means of said other roller, both rollers being provided with means for sealing planar joints of said sheet materials, means for cooling said planar joints at the outlet of said rollers and means for pressing and sealing [the] transversal joints of said individual molds thus formed; [at the outlet end of the machine.] *and* following said pressing and sealing means, there being means for cutting excess sheet material from the packed product and means for wrapping said excess sheet material.

3. Machine as claimed in claim 2, wherein the means forming half of the individual molds of the product to be packed, of each roller, comprise channeled surfaces, [which are] *said channeled surfaces being* shaped in sections of modular cylindrical envelope, and [removable] *removably* fixed to the corresponding rollers.

4. A process for the manufacture of a food product, comprising the steps of:

providing an elongated tube presenting an outlet end;

providing a pair of coacting rollers presenting corresponding outer surfaces and a nip therebetween, each of said rollers including an elongated recess formed in said outer surface thereof, said recesses successively coming into alignment with each other during rotation of the rollers, said tube extending through said nip;

continuously creating a series of aligned food-receiving cavities formed of a deformable material about said tube by passing a pair of deformable synthetic resin sheets into contact with said recesses and through said nip, and interconnecting said pair of sheets, and sequentially moving the cavities past said outlet end; and directing a flowable food material through said tube and out said outlet end in order to fill each of said cavities as the cavities pass said outlet end.

5. The process of claim 4, including the steps of providing a plurality of elongated, laterally spaced apart tubes each presenting an outlet end, continuously creating respective series of aligned food-receiving cavities formed of said deformable material about each of said tubes, and sequentially moving each respective series of said cavities past a corresponding outlet end, and directing a flowable food material through each tube and out the corresponding outlet end in order to fill each of said cavities as the cavities pass said outlet ends.

6. The process of claim 4, including the step of pressing each of said sheets into a corresponding recess in the adjacent roller, prior to passage of the sheets through said nip.

7. The process of claim 4, one of said rollers including a tube-receiving opening formed in the outer surface thereof, said elongated tube extending through said opening and *respective* recess.

8. The process of claim 4, including the step of sealing said deformable material between said cavities after said filling thereof in order to create a series of enclosed, food material-filled packages.

9. The process of claim 8, said sealing step comprising the step of thermally welding said deformable material.

10. The process of claim 8, including the step of separating said packages.

11. The process of claim 4, including the step of exerting a tensioning force on said deformable material during said process.

12. The process of claim 4, said tensioning step comprising the step of passing corresponding side margins of said deformable material through respective pairs of tensioning rollers.

13. Apparatus for the manufacture of a food product, comprising:

first and second adjacent, coacting, rotatable rollers each presenting an outer surface and with a nip therebetween, said first roller including an elongated first recess formed in said outer surface thereof, said second roller including an elongated second recess and a tube-receiving opening formed in said outer surface thereof, said first and second recesses successively coming into alignment with each other during rotation of said first and second rollers;

a sheet feeding mechanism adjacent said first and second rollers for continuously feeding corresponding first and second elongated sheets of deformable material through said nip during rotation of said rollers in order to successively create a series of aligned, food-receiving cavities;

an elongated tube presenting an inlet end and an outlet end and located between said first and second sheets of material and housed within said tube-receiving opening and second recess during said rotation of said rollers;

a food material feeder operatively coupled with said tube inlet end for passing a flowable food material through said tube and out said outlet end in order to successively fill said food-receiving cavities; and a cavity sealer operable to seal [the ends of] said cavities to form enclosed food-filled packages.

14. The apparatus of claim 13, said first roller presenting a plurality of axially spaced apart series of first recesses in said outer surface thereof, each of said series of first recesses including a plurality of axially aligned, circumferentially spaced first recesses, said second roller presenting a plurality of axially spaced apart series of second recesses in said outer surface thereof, each of said series of second recesses including a plurality of axially aligned, circumferentially spaced second recesses, there being a plurality of elongated tube-receiving openings formed in said second roller surface and extending between and communicating the second recesses of each of said series thereof, there further being a plurality of tubes each having an inlet end and an outlet end, each of said tubes being located within a corresponding tube-receiving opening.

15. The apparatus of claim 13, the outer surfaces of said first and second rollers having said first and second recesses therein being removable.

16. The apparatus of claim 13, said mechanism including first and second shapers respectively associated with said first and second rollers in order to force portions of the corresponding first and second sheets into said first and second recesses[,] and said tube-receiving opening, prior to passage of the first and second sheets through said nip.

17. The apparatus of claim 16, said first and second shapers each comprising an elongated shaft and a series of laterally spaced apart rollers mounted on each shaft, said rollers being located and configured for pressing said portions into said first and second recesses and said tube-receiving opening.

18. The apparatus of claim 13, said rollers including a sealing device operable to continuously seal together axially extending portions of said first and second sheets during rotation of the rollers.

19. The apparatus of claim 18, including a cooling device downstream of said rollers for cooling said sealed together axially extending portions of said first and second sheets.

20. The apparatus of claim 13, said cavity sealer comprising an elongated heat sealing bar extending transverse to the longitudinal axes of said cavities.

21. The apparatus of claim 13, including a cutting device for cutting excess sheet material from said packages.

22. A process for the manufacture of a food product, comprising the steps of:

providing an elongated tube presenting an outlet end;

continuously creating a series of aligned food-receiving cavities formed of a deformable material about said tube, and sequentially moving the cavities past said outlet end, said creating step including the step of heating said deformable material and directing a pressurized gas against the heated material; and directing a flowable food material through said tube and out said outlet end in order to fill each of said cavities as the cavities pass said outlet end.

23. The process of claim 22, including the steps of providing a pair of coacting rollers presenting corresponding outer surfaces and a nip therebetween, each of said rollers including an elongated recess formed in the outer surface thereof, said recesses successively coming into alignment with each other during rotation of the rollers, said creating step including the step of processing said material against said roller recesses and heating the material, and directing said pressurized gas against said pressed and heated material.

24. The process of claim 23, said material comprising individual sheets of synthetic resin material, each sheet being pressed against a corresponding roller recess.

25. A process for the manufacture of a food product, comprising the steps of:

providing an elongated tube presenting an outlet end;

continuously creating a series of aligned food-receiving cavities formed of a deformable material about said tube and presenting opposed ends, and sequentially moving the cavities past said outlet end, adjacent ones of said food-receiving cavities being in communication with each other through a restricted passageway extending between the proximal ends thereof; and directing a flowable food material through said tube and out said outlet end in order to fill each of said cavities as the cavities pass said outlet end, said filling step comprising the step of filling each of said cavities while the cavity being filled remains in communication with the previously filled cavity through said restricted passageway therebetween.

26. Apparatus for the manufacture of a food product, comprising:

first and second adjacent, coacting, rotatable rollers each presenting an outer surface and with a nip therebetween, said first roller including an elongated first recess formed in said outer surface thereof, said second roller including an elongated second recess and a tube-receiving opening formed in said outer surface thereof, said first and second recesses successively coming into alignment with each other during rotation of said first and second rollers;

a sheet feeding mechanism adjacent said first and second rollers for continuously feeding corresponding first and second elongated sheets of deformable material through said nip during rotation of said rollers in order to successively create a series of aligned, food-receiving cavities, a blower for directing pressurized air against said sheets to generally conform the sheets with said first and second recesses, an elongated tube presenting an inlet end and an outlet end and located between said first and second sheets of material and housed within said tube-receiving opening and second recess during said rotation of said rollers;

a food material feeder operatively coupled with said tube inlet end for passing a flowable food material through said tube and out said outlet end in order to successively fill said food-receiving cavities; and a cavity sealer operable to seal the ends of said cavities to form enclosed food-filled packages.

*27. A process for the manufacture of a food product, comprising the steps of:*

*providing an elongated tube presenting an outlet end;*

*providing a pair of rollers presenting corresponding outer surfaces and a nip therebetween, said tube extending through said nip;*

*passing a pair of synthetic resin sheets through said nip, and forming a pair of continuous longitudinal seals between said sheets on opposite sides of said tube;*

*continuously passing a flowable food material through the tube and out said outlet end thereof to substantially fill a region between said seals; and*

*transversely sealing said filled region by pressing a transverse sealing mechanism against the outside of the filled regions at spaced locations, in order to form discrete food packages.*

*28. The process of claim 27, each of said rollers including an elongated recess formed in said outer surface thereof, said elongated recesses of each of said rollers successively coming into alignment with each other during rotation of the rollers, and including the step of continuously creating a series of aligned food-receiving cavities about said tube during said passage of synthetic resin sheets through said nip.*

*29. The process of claim 27, one of said rollers including a tube-receiving opening formed in the outer surface thereof, said elongated tube extending through said opening.*

*30. The process of claim 27, said transverse sealing step comprising the step of thermally welding said synthetic resin sheets.*

*31. The process of claim 27, including the step of separating said discrete food packages.*

*32. The process of claim 27, including the step of exerting a tensioning force on said synthetic resin sheets during said process.*

*33. Apparatus for the manufacture of a food product comprising:*

*first and second adjacent rotatable rollers each presenting an outer surface and with a nip between said roller outer surfaces;*

*a sheet feeding mechanism adjacent said first and second rollers for continuously feeding corresponding first and second elongated sheets of synthetic resin material through said nip during rotation of said rollers,*

*said rollers operable to continuously form a pair of longitudinal seals between said sheets on opposite sides of said tube;*

*a food material feeder operatively coupled with said tube operable to continuously pass a flowable food material through the tube and out said outlet end thereof to substantially fill a region between said seals; and*

*a sealer operable to transversely seal said filled region by pressing transverse sealing mechanism against the outside of the filled regions at spaced locations, in order to form discrete food packages.*

*34. The apparatus of claim 33, each of said rollers including an elongated recess formed in said outer surface thereof, said elongated recesses of each of said rollers successively coming into alignment with each other during rotation of the rollers, said rollers operable to continuously create a series of aligned food-receiving cavities about said tube during said passage of synthetic resin sheets through said nip.*

*35. The apparatus of claim 33, one of said rollers including a tube-receiving opening formed in the outer surface thereof, said elongated tube extending through said opening.*

*36. The apparatus of claim 33, said transverse sealing step comprising the step of thermally welding said synthetic resin sheets.*

*37. The apparatus of claim 33, including the step of separating said discrete food packages.*

*38. The process of claim 33, including a device for exerting a tensioning force on said synthetic resin sheets during said process.*

* * * * *